United States Patent
Ilic et al.

(10) Patent No.: US 10,079,901 B2
(45) Date of Patent: *Sep. 18, 2018

(54) ELECTRONIC NOTIFICATIONS

(71) Applicant: Facebook, Inc., Menlo Park, CA (US)

(72) Inventors: Aleksandar Ilic, Los Altos, CA (US); Florin Ratiu, Mountain View, CA (US); John Torres Fremlin, Walnut, CA (US); David S. Park, Los Altos, CA (US); Matthew William Kelly, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,015

(22) Filed: Sep. 12, 2016

(65) Prior Publication Data

US 2016/0381165 A1    Dec. 29, 2016

Related U.S. Application Data

(63) Continuation of application No. 14/450,820, filed on Aug. 4, 2014, now Pat. No. 9,451,007.

(51) Int. Cl.
*H04L 29/08* (2006.01)
*H04L 12/58* (2006.01)

(52) U.S. Cl.
CPC ............. *H04L 67/26* (2013.01); *H04L 51/32* (2013.01); *H04L 67/22* (2013.01); *H04L 67/306* (2013.01)

(58) Field of Classification Search
CPC ......... H04L 67/02; H04L 67/22; H04L 67/26; H04L 67/306

USPC ............... 709/206, 217; 705/2, 14.66, 27.1
See application file for complete search history.

(56) References Cited

U.S. PATENT DOCUMENTS

| | | | | |
|---|---|---|---|---|
| 8,352,406 | B2* | 1/2013 | Costa | G06Q 10/1053 706/50 |
| 8,417,715 | B1* | 4/2013 | Bruckhaus | G06F 17/30994 705/26.1 |
| 9,166,961 | B1* | 10/2015 | Johansson | H04L 63/08 |
| 2012/0278262 | A1* | 11/2012 | Morgenstern | G06Q 10/10 706/12 |
| 2013/0091087 | A1* | 4/2013 | Prakash | G06Q 10/00 706/50 |
| 2013/0346922 | A1* | 12/2013 | Shiplacoff | G06F 3/04842 715/835 |

OTHER PUBLICATIONS

"Predicting User Activity Level in Social Networks"—Zhu et al, Hong Kong University of Science & Technology, Aug. 2013 http://www.cse.ust.hk/~yinz/cikm-13-predict-active.pdf.*

* cited by examiner

*Primary Examiner* — Randy Scott
(74) *Attorney, Agent, or Firm* — Baker Botts L.L.P.

(57) ABSTRACT

In one embodiment, a method includes accessing for a user one or more electronic notifications that include information about a social network. The social network includes a plurality of nodes connected by a plurality of edges, with at least one node corresponding to the user. The method further includes determining, for each of the electronic notifications, a score that estimates whether a user interaction with the social network will result if the electronic notification is provided to the user. The method further includes determining, based at least in part on the determined scores, an action to take with respect to the electronic notifications.

18 Claims, 4 Drawing Sheets

ELECTRONIC NOTIFICATIONS

PRIORITY INFORMATION

This application is a continuation of, and claims the benefit under 35 U.S.C. § 120 of, U.S. patent application Ser. No. 14/450,820 titled "ELECTRONIC NOTIFICATIONS" and filed 4 Aug. 2014.

TECHNICAL FIELD

This disclosure generally relates to evaluating electronic notifications for a user of a social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments of this disclosure relate to determining whether to send a user of a social network a notification about the social network. Whether to send a notification may be determined by scoring each of one or more notifications based on whether the user is likely to interact with the social network if the notification is provided to the user. The interaction may be any interaction, may be a specific interaction, and/or may be an interaction related to information in the notification. In addition to the score, a decision to send any or no notification may depend on any suitable factors, such as a prediction of the likelihood of a user unsubscribing to notifications due to the notification, and/or the length of time since a previous notification was sent to the user. A threshold may be associated with each factor, and the threshold and each factor may vary based on any suitable information, such as user demographics or other suitable information, a user's previous social-network activity, as a function of time, the content of the notification, the user's relationships in a social network, or any suitable combination thereof. Not sending a notification may itself be scored along with the candidate notifications.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
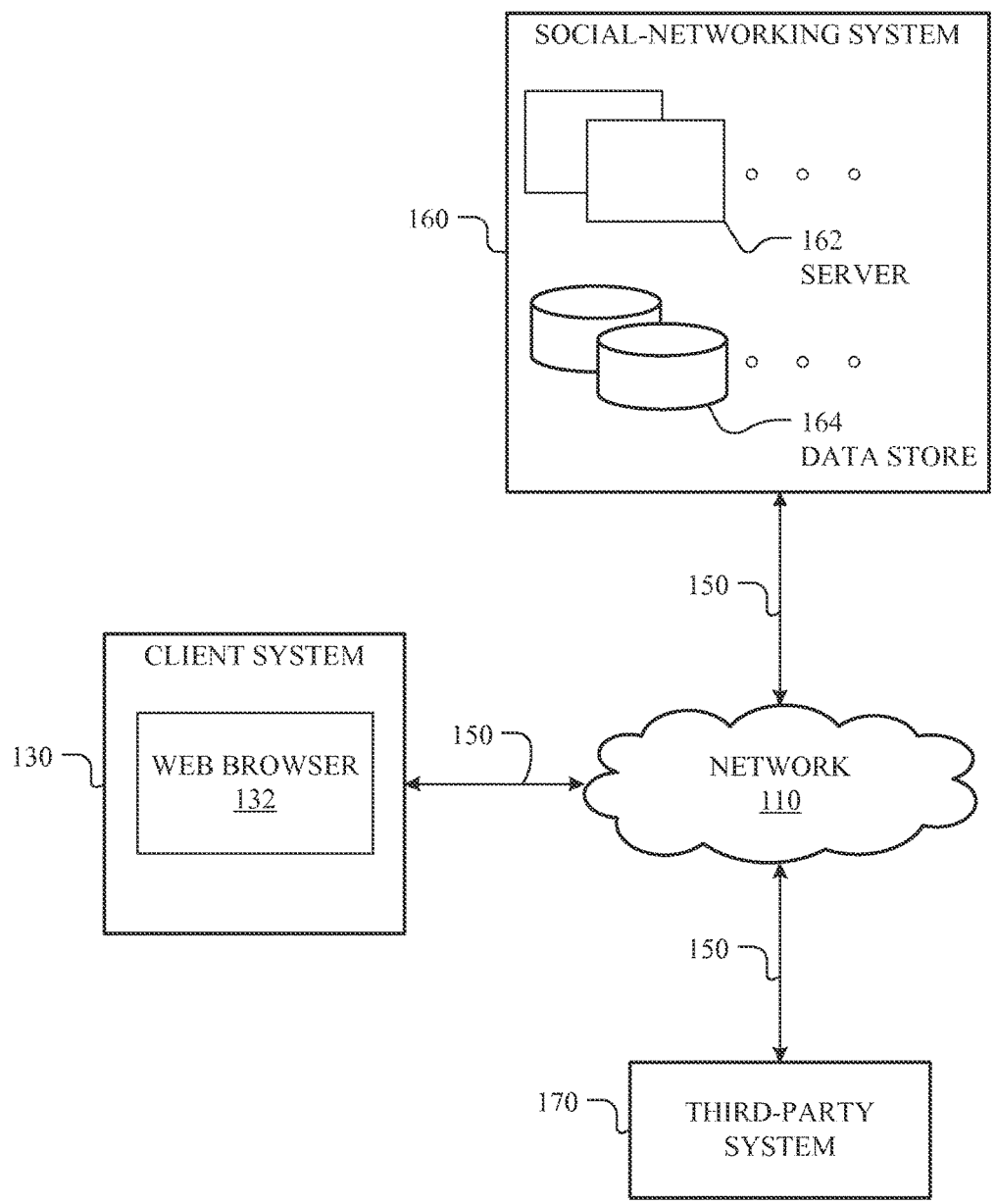
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
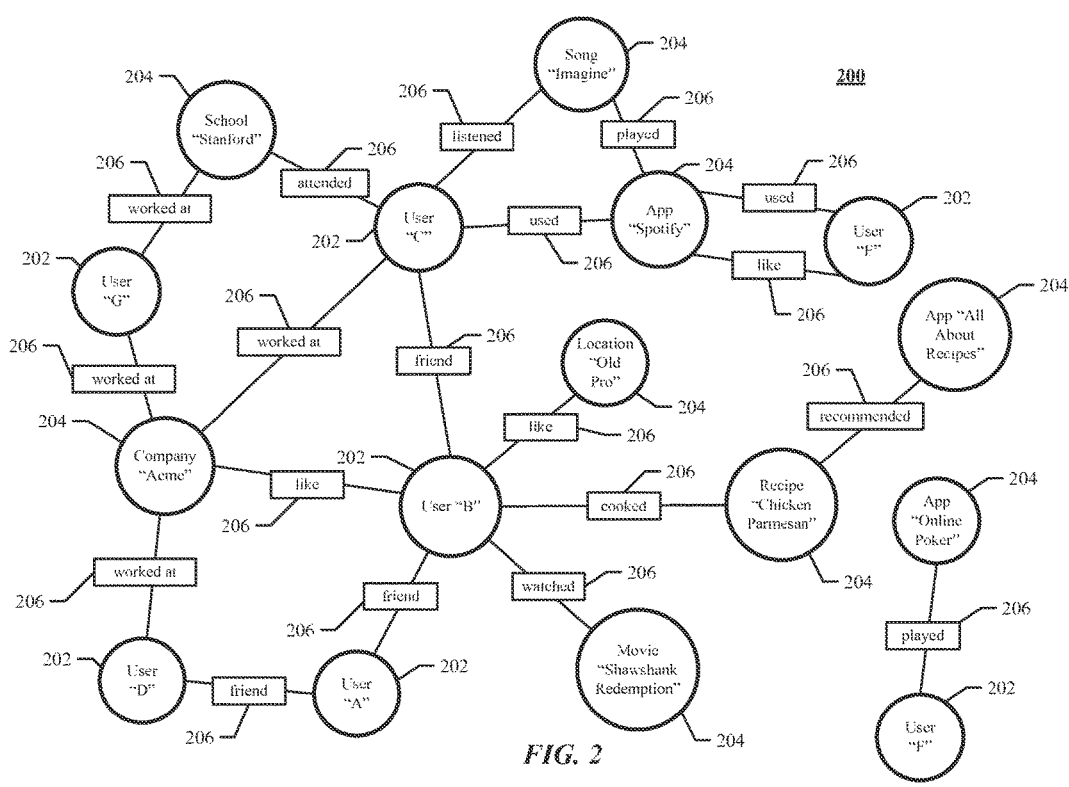
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

A user of a social network may receive notifications that describe the social network, users of the social network, activity on the social network, changes to the social network, suggestions related to the social network, and the like. For example, a notification may describe activity relevant to the user, such as that a friend on the social network has posted a picture or has "liked" one of the user's posts. As another example, notifications may describe one or more users who have viewed a profile page, created or posted content, interacted with content, been tagged in images, joined groups, are listed as attending or confirmed attendance at events, checked-in at locations, liked particular content, created pages, or any other activity related to the social network. Notifications may take any suitable form, such as an email, a push notification, or short message service message. In particular embodiments, notifications may relate to activity, persons, concepts, or relationships that a user has a relatively higher affinity for. For example, a notification may describe activity by the friends that a user interacts most often with.

Notifications may describe discrete activities, or may describe multiple activities. For example, a notification may describe that a user has received one friend request, or that a user has received multiple friend requests. In either example, the notification may or may not include an identification of all or some of the requesting individuals. A notification may describe one type of information related to the social network or may describe multiple types of information. For example, one notification may identify friend requests, while another notification identifies users that have interacted with content that the user receiving the notification has posted, while yet another notification may describe photos that the user has been tagged in. Those previous examples describe notifications that describe one type of information related to the social network. In contrast, a notification may describe that a user has friends requests and that a user has been tagged in a photo, or other suitable combination of types of information describing activity, persons, concepts, or relationships of the social network. In particular embodiments, and as described more fully herein, a notification may be scored based on the number and kind of events or information that the notification includes. Whether to aggregate or separate information in a notification may be determined based on any suitable information, including any suitable information used to score a notification, as described more fully herein. Notifications may be sent according to the user's privacy settings, and the content of the notifications may be determined based on one or more other users' privacy settings. For example, another user's activity may or may not appear in a notification based on that user's privacy settings.

A user may respond to a notification in a number of different ways. For example, if the notification includes an interactive element such as a link to social network content, the user may select the link. As another example, the user may view the notification and, at some later time, interact with the social network as a result of the notification. For example, a user who sees a notification that a friend has posted content may view the content, may view the friend's profile, or may recall that he needs to respond to an invitation to a party that the friend is going to and reply to that invitation. In each example, the notification may be the event that spurred the user to interact with the social network. In some of the examples, the interaction may relate to the information described in the notification. In other examples, the interaction may be any interaction with the social network.

A user may respond to a notification by doing nothing. At times, a user may respond negatively to a notification. For example, the user may unsubscribe to future notifications, may suspend or cancel their social network account, or may be annoyed by the notification and be less likely to interact with the social network.

Figure 3:
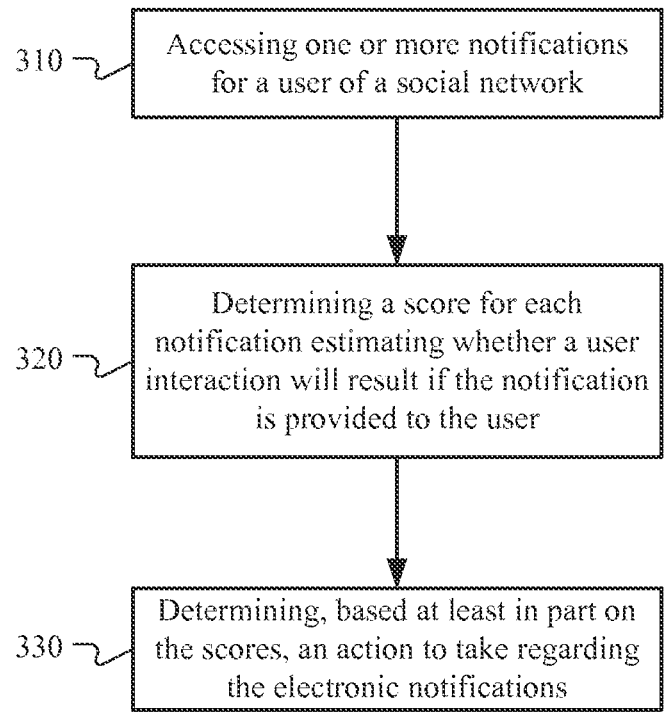
FIG. 3 illustrates an example method for evaluating notifications and whether they should be provided to a user of a social network.

FIG. 3 illustrates an example method for evaluating notifications and whether they should be provided to a user of a social network. The method may begin at step 310, where one or more notifications for the user are accessed. In particular embodiments, accessing notifications may include receiving the notifications from one or more devices or from memory of one or more devices. In particular embodiments, accessing a notification may include constructing the notification from activity, users, concepts, or relationships of a social network. As described more fully herein, a notification may describe any suitable information about the activity, users, concepts, or relationships of a social networking system.

At step 320, a score is determined for each notification accessed. The score represents an estimate of whether a user interaction will result if the notification is provided to the user. For example, the estimate may be a probability. As another example, an estimate may be a range of probabilities, such as for example 50-75%. This disclosure contemplates any suitable expression for an estimate of whether a user interaction will result if the notification is provided to the user. In particular embodiments, the user interaction may be any interaction with the social network. In other words, the score estimates whether the user will have any interaction with the social network, or may estimate whether the user will have particular interactions with the social network. In particular embodiments, the user interaction may be related to the content of the notification. In other words, the user interaction with the social network may be an interaction that with a portion of the social network that the notification describes or identifies. For example, in particular embodiments, a user interaction may be any interaction related to a user identified in the notification, such as visiting a profile of a user that a notification describes as tagging the user receiving the notification in a photo. In particular embodiments, a user interaction may be closely tailored to the content in the notification. For example, for a notification that describes a friend request, the user interaction may be responding to that specific friend request. In particular embodiments, step 320 may include determining whether a user interaction will result within a predetermined time period of providing the user with the notification or of the user viewing the notification. For example, step 320 may include determining a score estimating whether a user interaction will occur within one day from when the user is provided with the notification. In particular embodiments, step 320 may include determining whether a user interaction will result if the notification is sent at the current time, within a predetermined time period, or at a specific future time. In particular embodiments, a score may be associated with sending a notification at each or any suitable current or future time.

A score for a notification may be determined based on any suitable information. For example, a user may be more likely to respond to a notification if they have not received a notification in a predetermined period of time, or if they have not interacted with the social network (or engaged in a specific interaction with the social network) for a predetermined period of time. In particular embodiments, the score may be based on demographic information about the user for whom the notification is being scored. Example demographic information may include the user's age, gender, residence, sex, and any other suitable demographic, including those described more fully herein. In particular embodiments, the score may be based on one or more previous interactions between the user and the social network. For example, a notification that describes an activity that the user frequently or recently engages in, or a user or concept that the user frequently or recently interacted with, may receive a relatively higher score. As another example, a user that interacts frequently with a social network may be more receptive in general to notifications about the network. As another example, the type of interaction, such as liking photos in which a user has been tagged, may indicate that a notification that describes a photo in which the user was tagged should receive a higher score. In particular embodiments, the score may be based on a previous interaction that occurred within a predetermined time after a previous notification was sent to the user. For example, if the user has in the past accessed content that was referenced in a notification with 2 hours of being sent the notification, a notification with similar content or identifying a user that generated the content may receive a relatively high score. As another example, if a user regularly views photos from particular friends shortly after receiving a notification that those photos have posted, then the a notification describing that photos have posted from that friend or from any connection may receive a relatively higher score. In particular embodiments, previous interactions may be relevant to a score based on the length of time since the previous interaction, the frequency of the previous interaction, the time of the interaction, the user's characteristics (such as e.g., location) during the interaction, characteristics of one or more other users that the user interacted with or that generate or were referenced in content that the user interacted with, or the like. In particular embodiments, the score may be based on the time of day, a timezone a user is in, the user's location (e.g. as determined by GPS), cell-phone signal strength, the kind of communication a user's mobile device is using (e.g., via a WiFi network, via communication with a cellular telephone network, etc.), whether the user's mobile device is powered on or off, the amount of power remaining on the user's mobile device, or any suitable combination thereof. In particular embodiments, the score may be based on one or more devices that the user may receive the notification at, such as a mobile device or a desktop computer. In particular embodiments, the score may be based on how the notification is communicated to a user's device. For example, the score may be based on whether the notification will be sent via one or more a text message, a push notification, an email, or any other suitable communication method. in particular embodiments, the score may be based on explicit user preferences. While this disclosure describes specific examples of what the score may be based on, this disclose contemplates basing the score on any suitable criteria, including any suitable combination of the examples described above and/or below.

In particular embodiments, a score may be based at least in part on a relationship between the user and another user or content that the notification identifies. For example, a user may have a first-degree connection to another user (e.g., an edge connecting the two respective user nodes in the graph), and notifications regarding that other user may receive a relatively higher score. As another example, a relatively closer relationship between content and the user in the social graph may result in a relatively higher score for a notification that includes or identifies the content, compared to a notification that references content that the user has a relatively more remote relationship with or no relationship with. This disclosure contemplates any suitable relationships and any suitable measure for evaluating the strength of a relationship, including the disclosure herein regarding affinity, coefficient, and relationships.

In particular embodiments, a score may be based at least in part on the information about the notification itself. Such information may include the type of notification; the amount of content in the notification; the amount of detail in the notification; the time the notification is provided to the user; the activity, users, concepts, or relationships referenced in the notification; or any other suitable information about the notification or that the notification includes. For example, a user's affinity for information referred to in a notification may be used to score the notification.

At step 330, an action to take with respect to the notifications is determined, with the determination being based at least in part on the scores. For example, the highest scoring notification may be selected and provided to the user. In particular embodiments, step 330 may include determining an action to take based both on the scores and on an elapsed time since a previous electronic notification was provided to the user. For example, a user that has been sent a notification within the past hour or day may be less likely to respond positively to another notification, and thus the relatively short elapsed time since the previous notification may weigh against providing a notification that even scores relatively highly. In particular embodiments, the score and the elapsed time may be separate variables that are used to determine the action to take. In particular embodiments, a score may be a function of elapsed time. For example, in particular embodiments, the score may increase as any suitable function of elapsed time. As indicated by these examples, in particular embodiments, the action to take may include selecting a notification to provide to a user, may include selecting notifications to evaluate again at a later time, or may include deciding that no notifications should be sent at the moment or for a predetermined time period. In particular embodiments, not sending a notification may itself be scored and compared to the scores for the notifications. If the score associated with not sending a notification is the highest score or exceeds a threshold, then not sending a notification may be the action taken.

In particular embodiments, the action to take may be determined at least by the score and by a value estimating whether the user will unsubscribe to future notifications if one of the notifications being scored is provided to the user. The value may be determined based on any suitable information, such as the user's characteristics, characteristics of users or concepts that the notification relates to, the user's past interactions with the social network, the user's relationships or affinities, an elapsed time since a notification was sent, the user's past response to previous notifications, the notification itself and the information about the social network that it communicates, or any other suitable combination thereof. For example, if a user has previously unsubscribed to notifications sent in a certain format (e.g., via text message) or within a certain time period after a certain kind of notification, then similar notifications may have a relatively higher chance of causing the user to unsubscribe to future notifications. This disclose contemplates determining the value based on any of the suitable information that may be used to determine the score, as described more fully herein.

In particular embodiments, the action to take may be determined based on the score, the elapsed time, and the value estimating whether a user is likely to unsubscribe to future notifications. In particular embodiments, a threshold may be associated with each of those variables, and each notification may be evaluated based on comparing the variable to its appropriate threshold. This disclosure contemplates any suitable algorithm for determining an action to take with respect to one or more notifications. For example, in particular embodiments, a notification may be provided to a user if at least one of the notifications satisfies:

$$((\text{score} > T_1) \text{ OR } (\text{elapsed time} > T_2)) \text{ AND } (\text{value} < T_3) \quad (1)$$

If more than one notification satisfies that criteria, then one of the notifications may be provided to the user. For example, the notification provided may be the highest scoring notification, the notification least likely to result in the user unsubscribing, or some combination of those variables. If no notification meets the criteria of (1), then no notification may be sent to the user. As described more fully herein, the score, the value, each of the thresholds, and the content of the notification may all be tailored to a user, meaning that each of the those aspects may be based at least in part on the information about the user and/or the information in the social networking system.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for evaluating notification for a user of a social network including the particular steps of the method of FIG. 3, this disclosure contemplates any suitable method for evaluating notification for a user of a social network including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

As described more fully herein, in particular embodiments, an action to be taken with respect to one or more notifications may be based on a score estimating whether a user will interact with a social network if the user is provided the notification. A user interaction may be inferred to be caused by or related to the notification by, for example, attributing any interaction to a notification if that interaction occurs within a predetermined time period of the user being provided with or viewing the notification. In particular embodiments, the interaction may be attributed only if it has some relationship to the information provided in the notification. In particular embodiments, a notification may include an interactive element through which a user can initiate an interaction with the social network. In those embodiments, attributing an interaction to a notification may be more readily measurable, but may not attribute all interactions, such as when the user views the notification and simply accesses the social network through a channel other than by interacting with the notification. In particular embodiments, step 330 of the example method illustrated by FIG. 3 may include determining an action based on the score and on a value estimating the likelihood of a user interacting with an interactive element on a notification. As for the score, in particular embodiments, that value may be based on any suitable information about the user, the user's relationships, or any other information describing the user's social context. In particular embodiments, the score and the value may be combined and compared to a single threshold. For example, the score and the value may be weighted or non-weighted, and may be combined linearly or non-linearly. In particular embodiments, the score and the value may be compared to separate thresholds, and the determination may be based on either or both those variables exceeding their respective thresholds.

In particular embodiments, a user's interaction with a social network may be observed and used to improve the notifications sent to the user and/or the determination of whether to send a notification to the user. For example, user's interactions with a social network may be observed, attribute to one or more notifications (as described more fully herein), and input into one or more machine-learning models. This disclosure contemplates any suitable machine-learning model, such as a linear model, non-linear model, a decision tree model (e.g., a boosted decision tree), logistic regression, or any suitable combination thereof. A user's interaction may be given Boolean values (e.g., indicating that they user did or did not interact with the social network) or may have more values (e.g. an interaction gets higher score when the interaction is liking a post specifically referenced in a notification rather than simply logging in to the social network). Training of machine-learning models may be on any suitable schedule. For example, training may be performed daily and may be based on any suitable set of data, such as for example a sample of the user's behavior over the last week, month, or year. In particular embodiments, more recent interactions may be given a relatively higher weight than less recent interactions.

Figure 4:
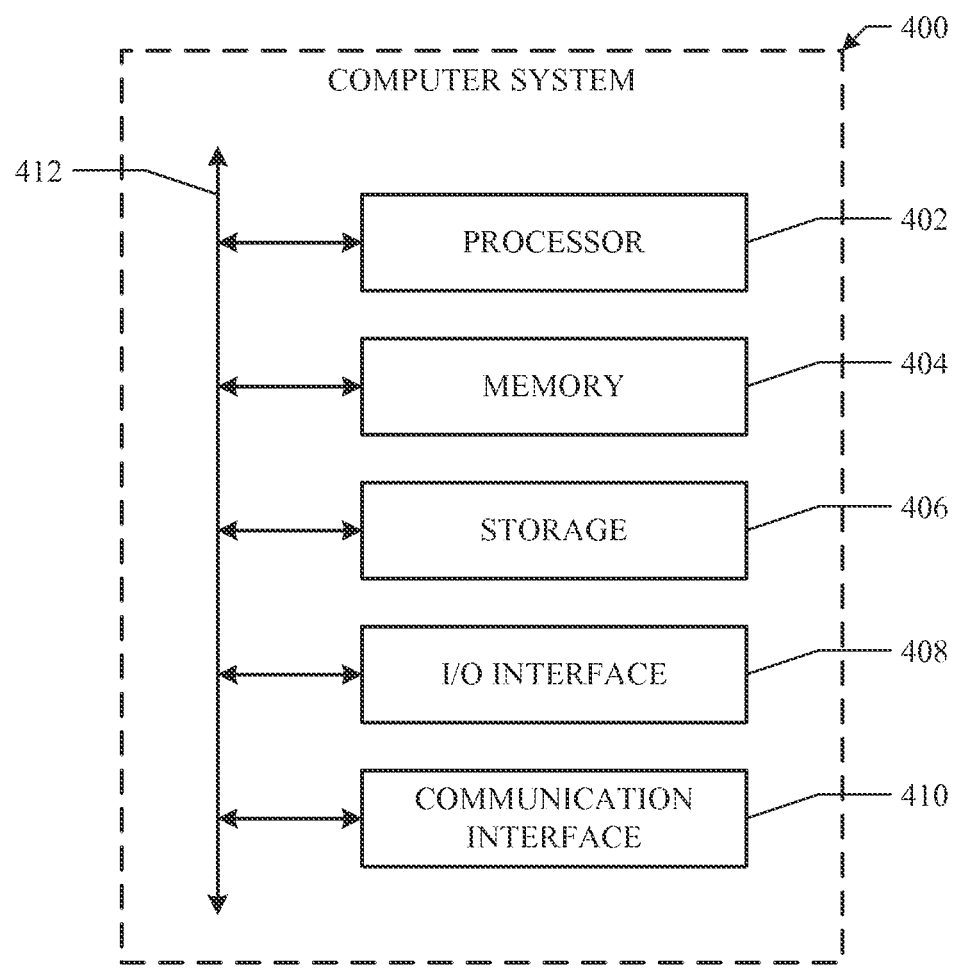
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, accessing for a user one or more electronic notifications comprising information about a social network, the social network comprising a plurality of nodes connected by a plurality of edges, at least one node corresponding to the user;
   by a computing device, determining, for each of the electronic notifications, a score comprising an estimate of whether a user interaction with the social network will result if the electronic notification is provided to the user, wherein the scores are associated with a first threshold;
   by a computing device, determining an elapsed time since a previous electronic notification was provided to the user, wherein the elapsed time is associated with a second threshold;
   by a computing device, determining a value comprising an estimate of whether the user will unsubscribe to future electronic notifications if one of the electronic notifications is provided to the user, wherein the value is associated with a third threshold; and
   by a computing device, determining, based at least in part on the determined scores, the elapsed time, and the value, an action to take with respect to the electronic notifications.

2. The method of claim 1, wherein the information about the social network comprises one or more of:
   information about one or more other users of the social network;
   a request from one or more other users of the social network;
   an interaction between one or more other users and the social network; or
   information about one or more concepts associated with the social network, each concept represented by a node in the social network.

3. The method of claim 1, wherein the user has not interacted with the social network within a predetermined time period.

4. The method of claim 1, wherein the user interaction with the social network comprises a user interaction with a portion of the social network described by the information about the social network.

5. The method of claim 4, wherein the user interaction comprises one or more of:
   accessing, from the social network, information about or generated by another user identified in the electronic notification;
   accessing, from the social network, information about a concept identified in the electronic notification; or
   responding to another user's request identified by the electronic notification.

6. The method of claim 1, wherein the score is based at least in part on demographic information about the user.

7. The method of claim 1, wherein the score is based at least in part on a previous interaction between the user and one or more objects in the social network.

8. The method of claim 1, wherein the score is based at least in part on one or more relationships between the user and another entity in the social network.

9. The method of claim 1, wherein the score is based at least in part on the information comprising the electronic notification.

10. The method of claim 9, wherein the score is based at least in part on an affinity between the user and one or more of:
    another user identified by the information; or
    a concept identified by the information.

11. The method of claim 1, wherein determining, based at least in part on the determined scores, an action to take with respect to the electronic notifications comprises determining, based at least in part on the determined scores and on an elapsed time since a previous electronic notification was provided to the user, an action to take with respect to the electronic notifications.

12. The method of claim 11, wherein each score depends at least in part on an elapsed time since a previous electronic notification was provided to the user.

13. The method of claim 1, wherein determining an action to take with respect to the electronic notifications comprises selecting the highest scoring notification to provide to the user when:
    the score associated with the highest scoring notification is not less than the first threshold or the elapsed time is not less than the second threshold; and
    the value is less than the third threshold.

14. The method of claim 1, wherein determining an action to take with respect to the electronic notifications comprises selecting none of the notifications to provide to the user when:
    the score associated with the highest scoring notification is less than the first threshold and the elapsed time is less than the second threshold; or
    the value is greater than the third threshold.

15. The method of claim 1, wherein each of the thresholds depend on one or more of:
    one or more demographics of the user;
    one or more pervious interactions between the user and one or more objects in the social network; or
    the information comprising the electronic notification being scored.

16. The method of claim 1, further comprising determining, for each of the electronic notifications, a value comprising an estimate of whether the user will interact with a portion of the electronic notification if the electronic notification is provided to the user, the interaction with the portion of the electronic notification initiating an interaction with the social network, wherein determining, based at least in part on the determined scores, an action to take with respect to the electronic notifications comprises determining, based at least in part on the determined scores and on the determined values, an action to take with respect to the electronic notifications.

17. One or more computer-readable non-transitory storage media embodying software that is operable when executed to:
    access for a user one or more electronic notifications comprising information about a social network, the social network comprising a plurality of nodes connected by a plurality of edges, at least one node corresponding to the user;
    determine, for each of the electronic notifications, a score comprising an estimate of whether a user interaction with the social network will result if the electronic notification is provided to the user, wherein the scores are associated with a first threshold;
    determine an elapsed time since a previous electronic notification was provided to the user, wherein the elapsed time is associated with a second threshold;

determine a value comprising an estimate of whether the user will unsubscribe to future electronic notifications if one of the electronic notifications is provided to the user, wherein the value is associated with a third threshold; and determine, based at least in part on the determined scores, the elapsed time, and the value, an action to take with respect to the electronic notifications.

18. A system comprising:

one or more processors; and a memory coupled to the processors comprising instructions executable by the processors, the processors being operable when executing the instructions to:

access for a user one or more electronic notifications comprising information about a social network, the social network comprising a plurality of nodes connected by a plurality of edges, at least one node corresponding to the user;

determine, for each of the electronic notifications, a score comprising an estimate of whether a user interaction with the social network will result if the electronic notification is provided to the user, wherein the scores are associated with a first threshold;

determine an elapsed time since a previous electronic notification was provided to the user, wherein the elapsed time is associated with a second threshold;

determine a value comprising an estimate of whether the user will unsubscribe to future electronic notifications if one of the electronic notifications is provided to the user, wherein the value is associated with a third threshold; and determine, based at least in part on the determined scores, the elapsed time, and the value, an action to take with respect to the electronic notifications.

* * * * *